(12) United States Patent
Maher

(10) Patent No.: US 8,183,829 B2
(45) Date of Patent: May 22, 2012

(54) VEHICLE SYSTEM INCLUDING A PLURALITY OF WHEELED VEHICLES DOCKED FOR VENDING AND RECHARGING

(75) Inventor: Jay A. Maher, Barrington, IL (US)

(73) Assignee: Nelson Wittaker, Crystal Lake, IL (US)

( * ) Notice: Subject to any disclaimer, the term of this patent is extended or adjusted under 35 U.S.C. 154(b) by 480 days.

(21) Appl. No.: 12/369,438

(22) Filed: Feb. 11, 2009

(65) Prior Publication Data
US 2009/0174363 A1    Jul. 9, 2009

Related U.S. Application Data

(63) Continuation-in-part of application No. 11/089,972, filed on Mar. 25, 2005, now Pat. No. 7,748,511.

(51) Int. Cl.
*H02J 7/00* (2006.01)
*B60K 1/04* (2006.01)
*B65G 1/00* (2006.01)

(52) U.S. Cl. .......... 320/109; 320/104; 320/107; 104/34; 414/281; 414/282; 414/283; 414/284; 414/285

(58) Field of Classification Search .................. 320/109
See application file for complete search history.

(56) References Cited

U.S. PATENT DOCUMENTS

| | | | | |
|---|---|---|---|---|
| 5,158,310 A | * | 10/1992 | Tannehill et al. | 280/33.992 |
| 5,252,078 A | * | 10/1993 | Langenbahn | 439/34 |
| 5,272,431 A | * | 12/1993 | Nee | 320/109 |
| 5,773,954 A | * | 6/1998 | VanHorn | 320/137 |
| 6,087,806 A | * | 7/2000 | Fujioka | 320/109 |
| 6,371,230 B1 | * | 4/2002 | Ciarla et al. | 180/68.5 |
| 7,023,177 B1 | * | 4/2006 | Bussinger | 320/109 |
| 7,036,725 B2 | * | 5/2006 | Blaeuer | 235/383 |
| 7,434,672 B2 | * | 10/2008 | Buer | 192/70.17 |
| 7,475,886 B2 | * | 1/2009 | Otterlee et al. | 280/33.993 |
| 7,619,319 B1 | * | 11/2009 | Hunter | 290/4 R |
| 7,741,808 B2 | * | 6/2010 | Fowler et al. | 320/107 |
| 2008/0297108 A1 | * | 12/2008 | Le Gars | 320/109 |
| 2010/0078903 A1 | * | 4/2010 | Bravo | 280/33.992 |

* cited by examiner

Primary Examiner — Patrick Assouad
Assistant Examiner — Nathaniel Pelton
(74) Attorney, Agent, or Firm — Barnes & Thornburg LLP

(57) ABSTRACT

A system employing wheeled vehicles, such as strollers. A plurality of the wheeled vehicles is provided, each having a docking element. A vehicle station has a docking port for each of at least some of the wheeled vehicles. Each docking port has a charging device and is shaped to engage a docking element of an engaged wheeled vehicle. At least two display screens are provided on the wheeled vehicle, one for an occupant and one for an operator. One or more screen drivers is provided for the display screens.

9 Claims, 9 Drawing Sheets

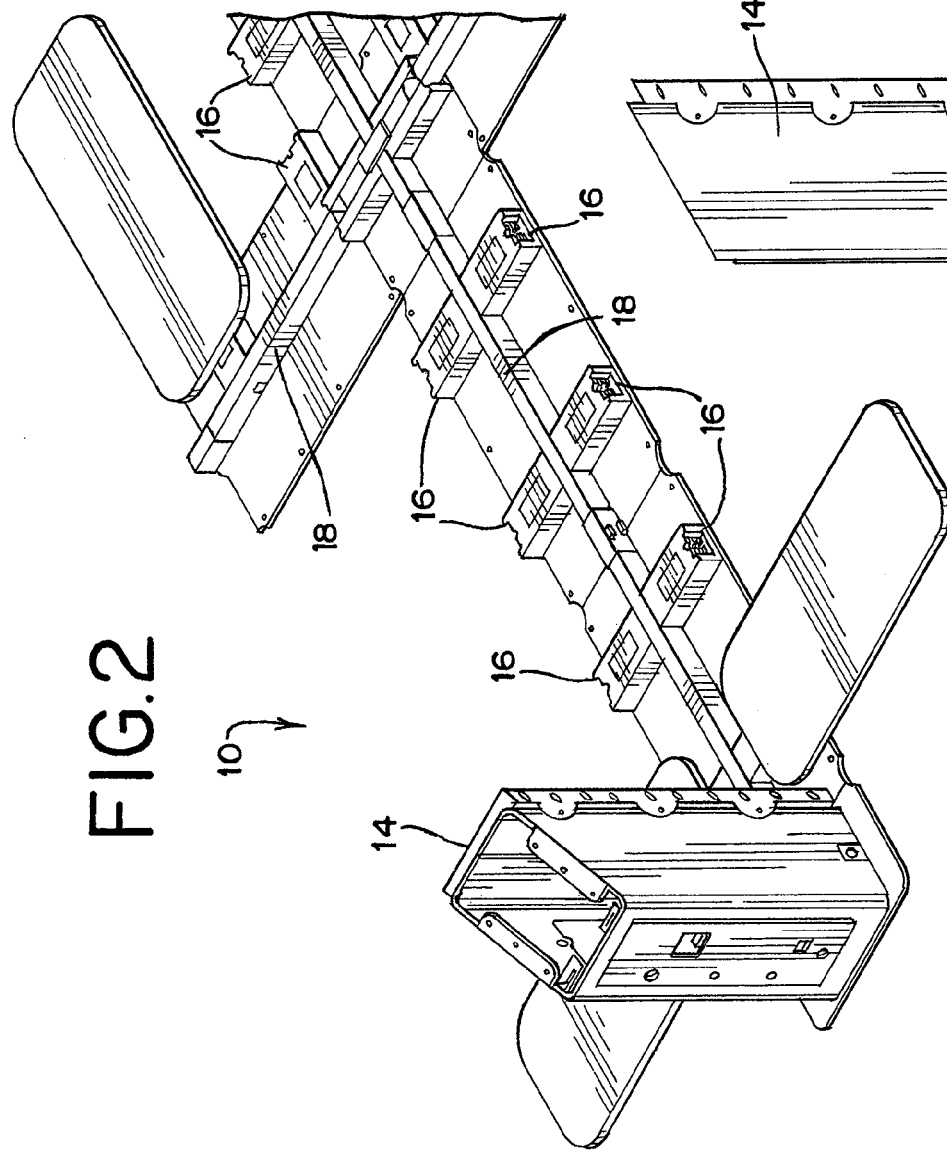
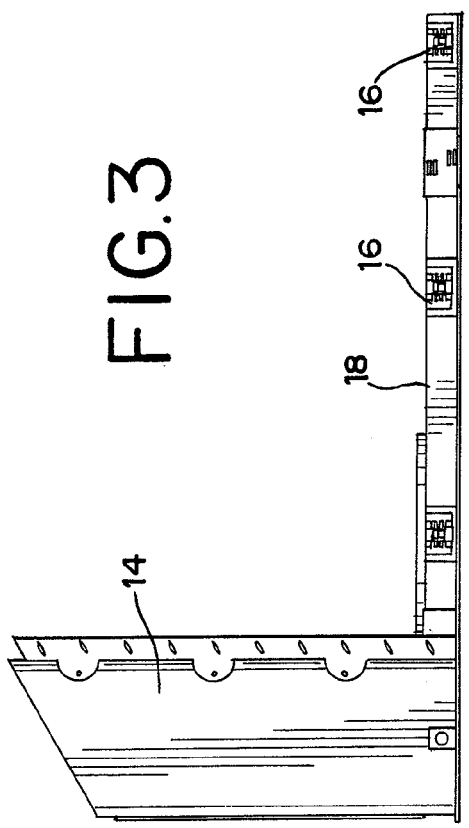

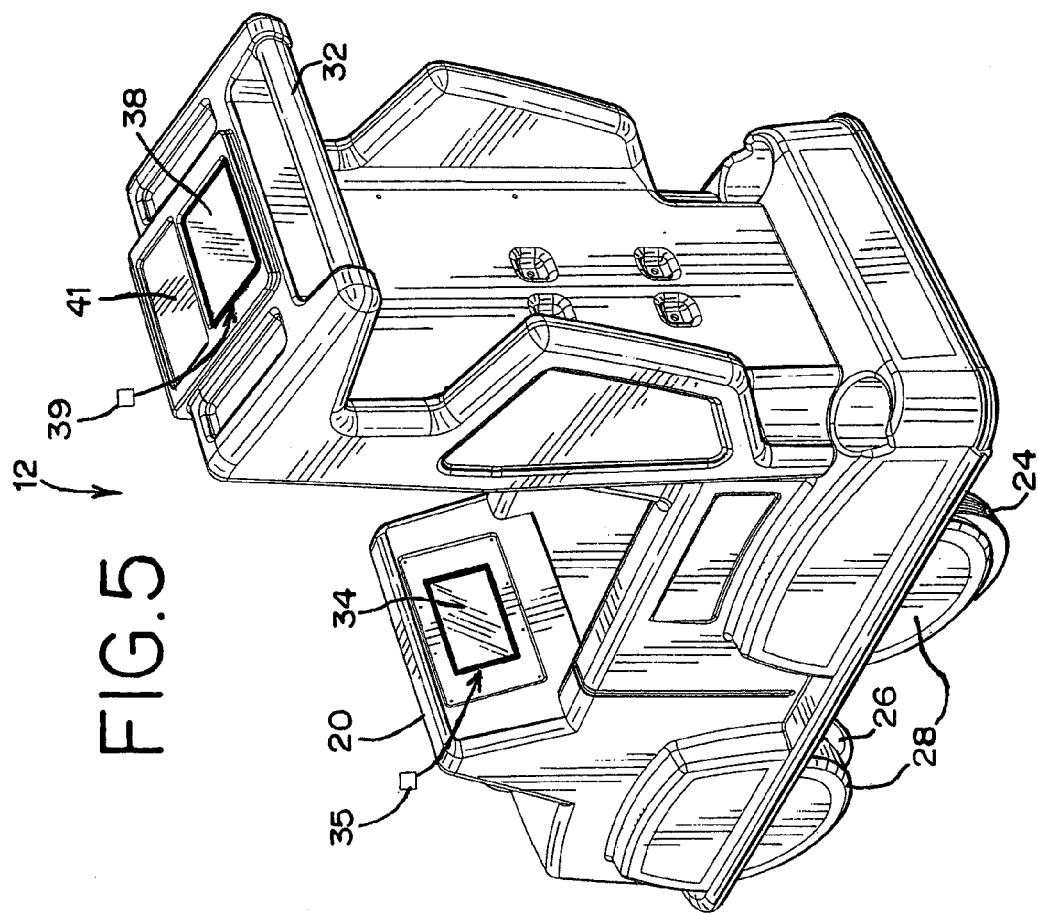
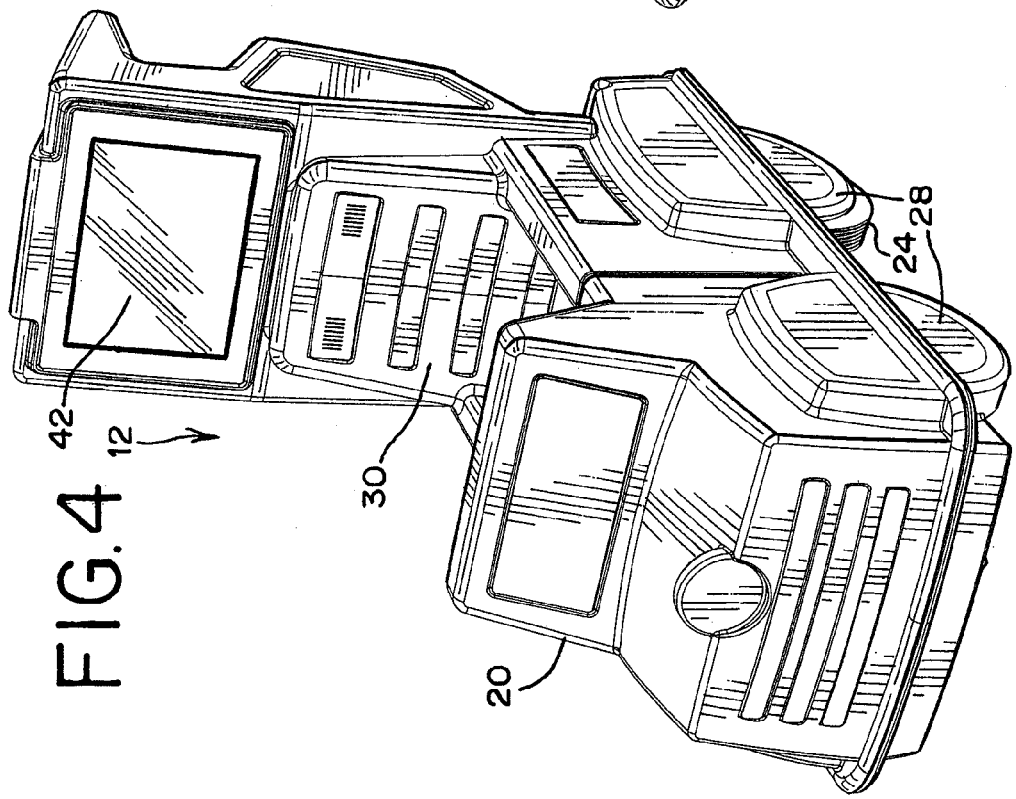

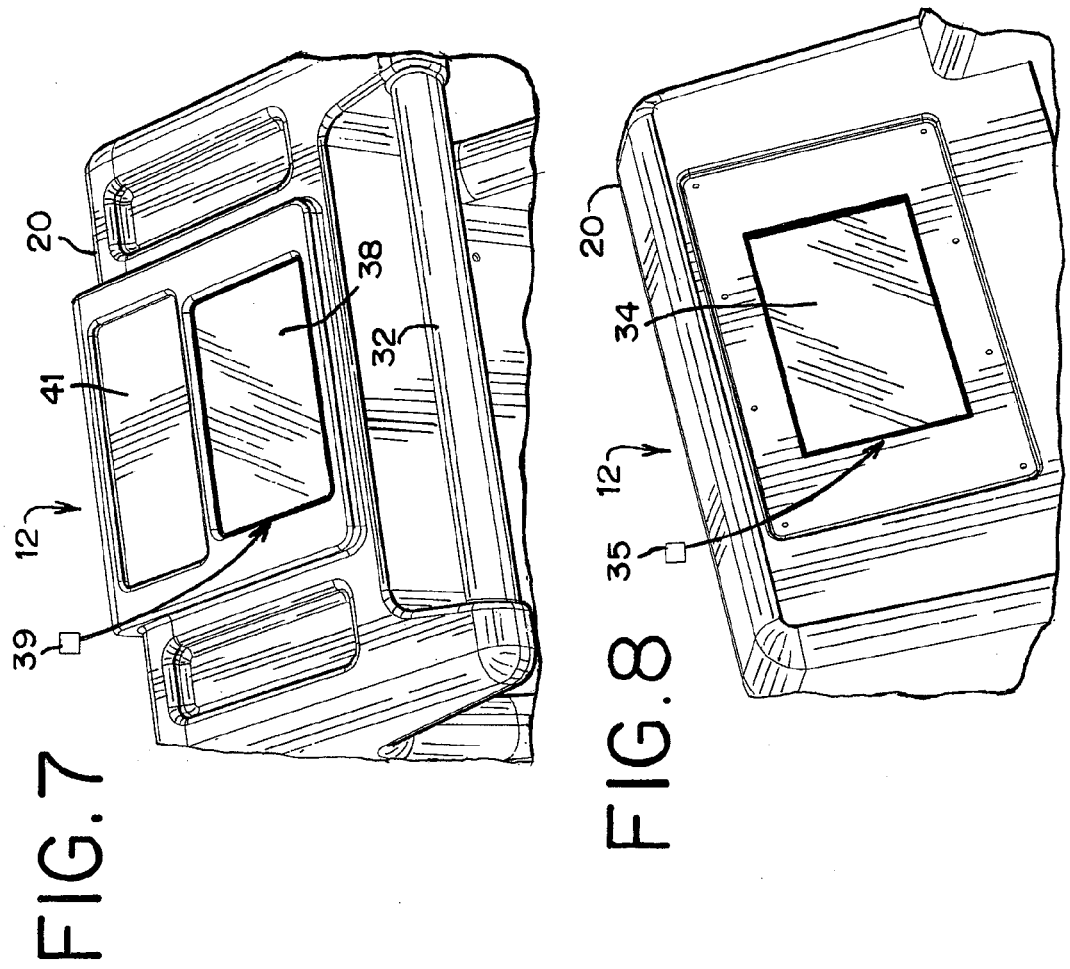
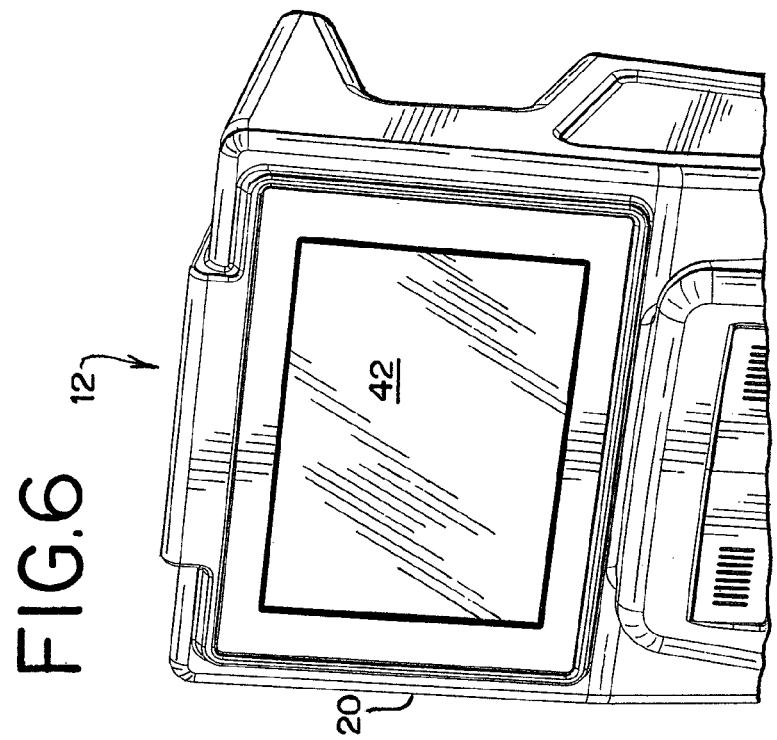

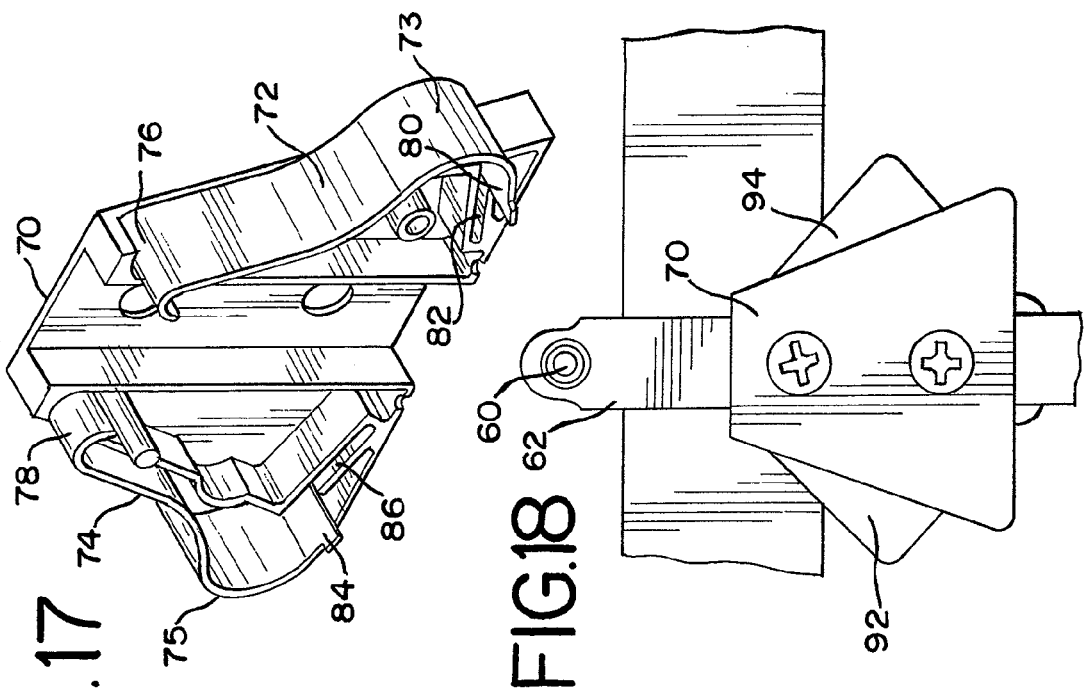
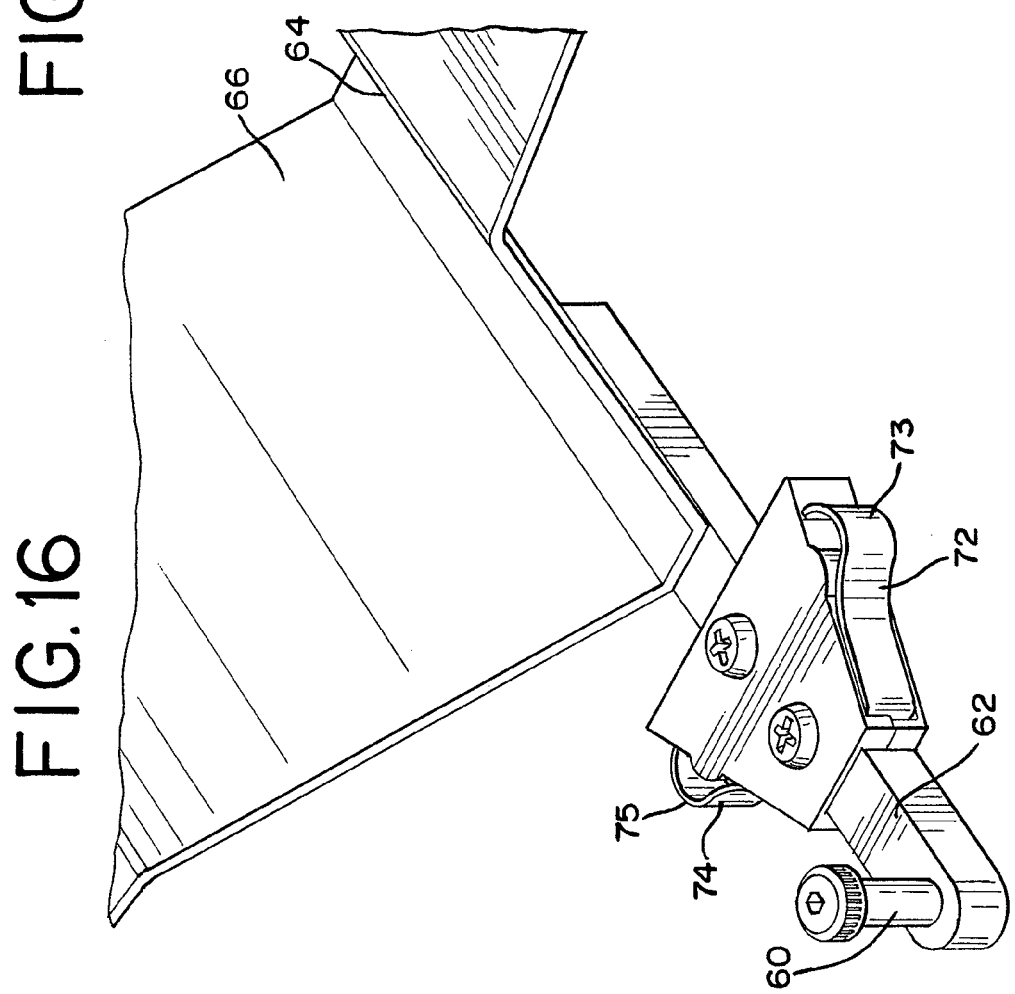

VEHICLE SYSTEM INCLUDING A PLURALITY OF WHEELED VEHICLES DOCKED FOR VENDING AND RECHARGING

RELATED APPLICATION

This application is a continuation-in-part of co-pending U.S. patent application Ser. No. 11/089,972, filed Mar. 25, 2005.

BACKGROUND OF THE INVENTION

This invention relates to wheeled vehicles, such as strollers, and in particular to a wheeled vehicle system employing a plurality of such vehicles, at least some of which may be docked in docking ports for electrical charging and vending.

Vending systems four-wheeled vehicles are well known. For example, a vending system for carts and the like has been used for years in airports and other locations, and U.S. Pat. Nos. 3,978,959; 4,450,968; 4,518,073 and 6,142,283 are directed to that system. Co-pending U.S. patent application Ser. No. 11/089,972, the disclosure of which is incorporated by reference, is directed to another vending system for wheeled vehicles, such as strollers.

Another vending system for unattended vending of bicycles is set forth in U.S. Pat. No. 5,917,407. It includes a series of bays in which individual bicycles are locked, and a vending control tower for vending of individual bicycles. It also includes a particular means of holding locked bicycles in place. Another type of similar locking device is set forth in U.S. Pat. No. 6,085,887.

SUMMARY OF THE INVENTION

The invention is directed to a wheeled vehicle system comprising a plurality of wheeled vehicles, each wheeled vehicle having a docking element. A vehicle station is provided, having a docking port for each of at least some of the wheeled vehicles. Each docking port has a vehicle charging device, and is shaped to engage a wheeled vehicle docking element.

An occupant display screen is associated with each vehicle. An operator display screen is also associated with each of the vehicles. A first screen driver is provided for the occupant display screen, and a second screen driver is provided for the operator display screen.

In accordance with the preferred form of the invention, the wheeled vehicle system includes a battery on board each wheeled vehicle connected for providing power to the screen drivers and the display screens. The battery is sized depending on the power needed.

The docking element comprises an extended docking guide and spaced first electric contacts carried by the docking guide. The electric contacts are displaceable relative to the docking guide.

The docking port is shaped to accommodate penetration by the docking element. The vehicle charging device includes spaced second electrical contacts in registration with and contactable by respective ones of the first electrical contacts carried by the docking element when the docking port is penetrated by the docking guide.

Preferably, the screen drivers are separate from one another. Each screen driver includes a memory having content different from content of the other screen driver. In accordance with one form of the invention, a third display screen is associated with each wheeled vehicle.

The docking system according to the invention for charging a battery carried by the wheeled vehicle comprises a docking element carried by the wheeled vehicle, with the docking element comprising the extended docking guide and spaced first electrical contacts carried by the docking guide, with the first electrical contacts being displaceable relative to the docking guide. The docking system further includes a fixed docking port, with the docking port being shaped to accommodate penetration by the docking guide and having spaced second electrical contacts in registration with and contactable by respective ones of the first electrical contacts when the docking port is penetrated by the docking guide.

The first electrodes each comprise an elongate contact mounted at one end in a contact housing. In one form, each comprises a strip having a protuberance proximate an opposite free end. Each opposite free end extends into a guide channel in the contact housing.

BRIEF DESCRIPTION OF THE DRAWINGS

The invention is described in greater detail in the following description of examples embodying the best mode of the invention, taken in conjunction with the drawing figures, in which:

FIG. 2 is a further partial schematic view similar to FIG. 1, but from the opposite direction, FIG. 3 is a side elevational view of the vehicle station, FIG. 4 is an enlarged front perspective view of a wheeled vehicle, such as a stroller, according to the invention, FIG. 5 is an enlarged perspective view of the wheeled vehicle of FIG. 4 taken from a rear perspective, FIG. 6 is an enlarged cutaway perspective view of the upper portion of the wheeled vehicle, showing one of the operator screens, FIG. 7 is an enlarged perspective view of the opposite side of the upper portion of the wheeled vehicle as shown in FIG. 6, showing the other of the operator screens, FIG. 8 is an enlarged perspective view of the portion of the wheeled vehicle having the occupant display screen, FIG. 16 is an enlarged perspective view of the docking element, FIG. 17 is a bottom perspective view of the electrical contact portion of the docking port, and FIG. 18 is a bottom plan view of an alternative form of electrical contacts for providing charging power to a wheeled vehicle.

DESCRIPTION OF EXAMPLES EMBODYING THE BEST MODE OF THE INVENTION

Figure 1:
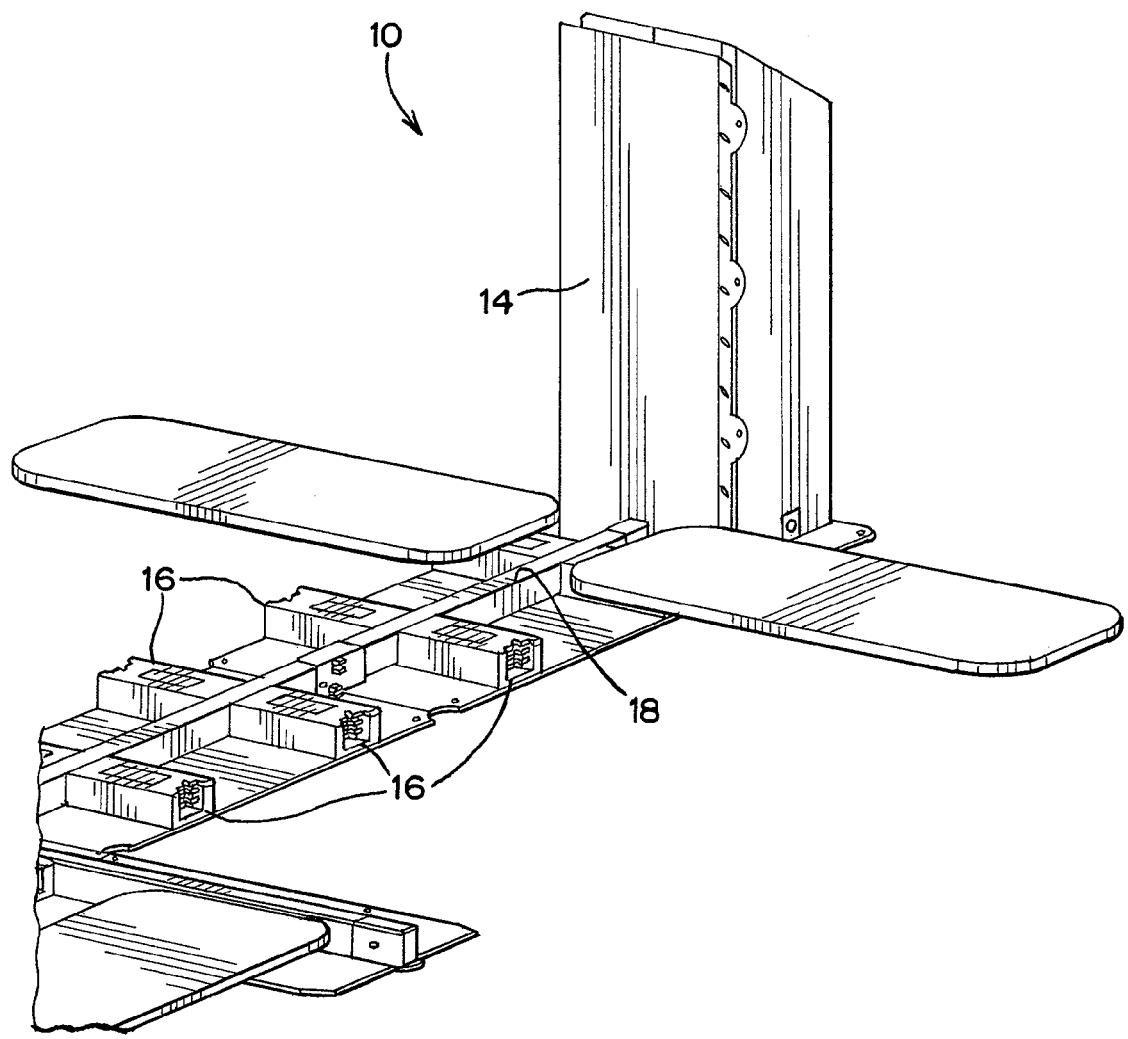
FIG. 1 is a partial schematic view of a vehicle station having vehicle docking ports.
Figure 9:
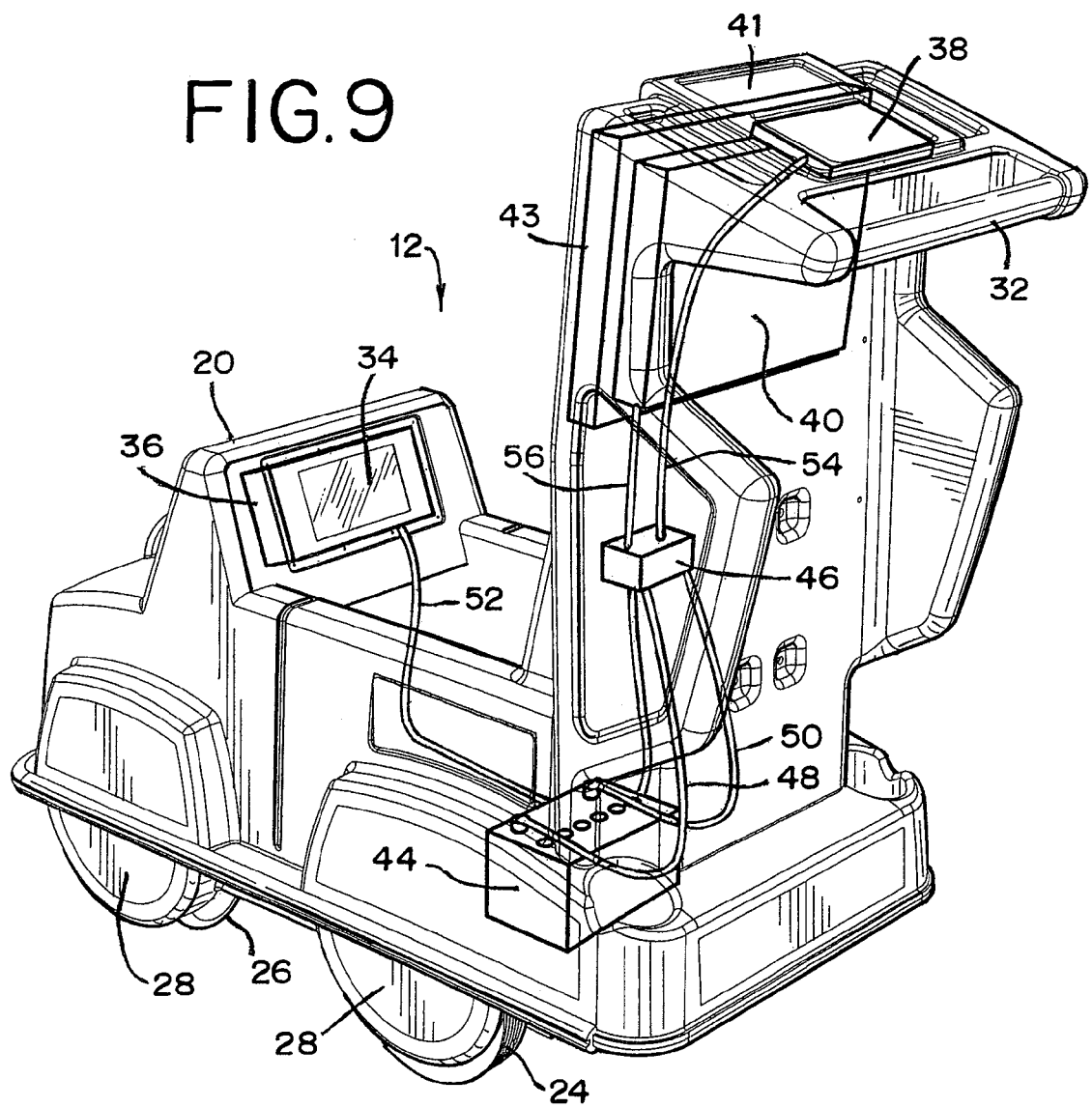
FIG. 9 is a schematic perspective illustration of a wheeled vehicle in accordance with the invention of the present application, showing basic wiring from the battery to the display screens and screen drivers.
Figure 10:
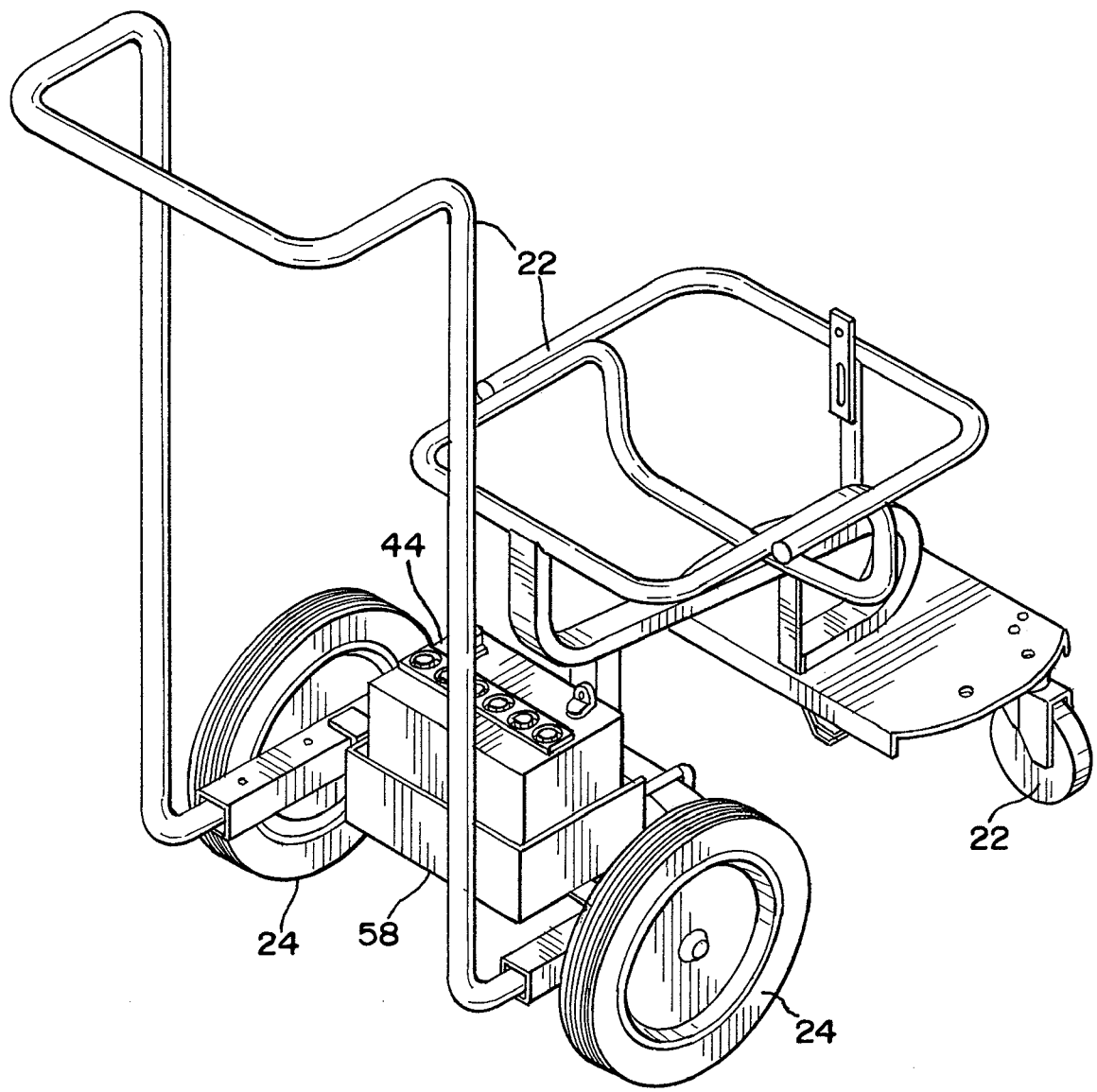
FIG. 10 is a rear perspective view of the frame structure of the wheeled vehicle of the invention.
Figure 11:
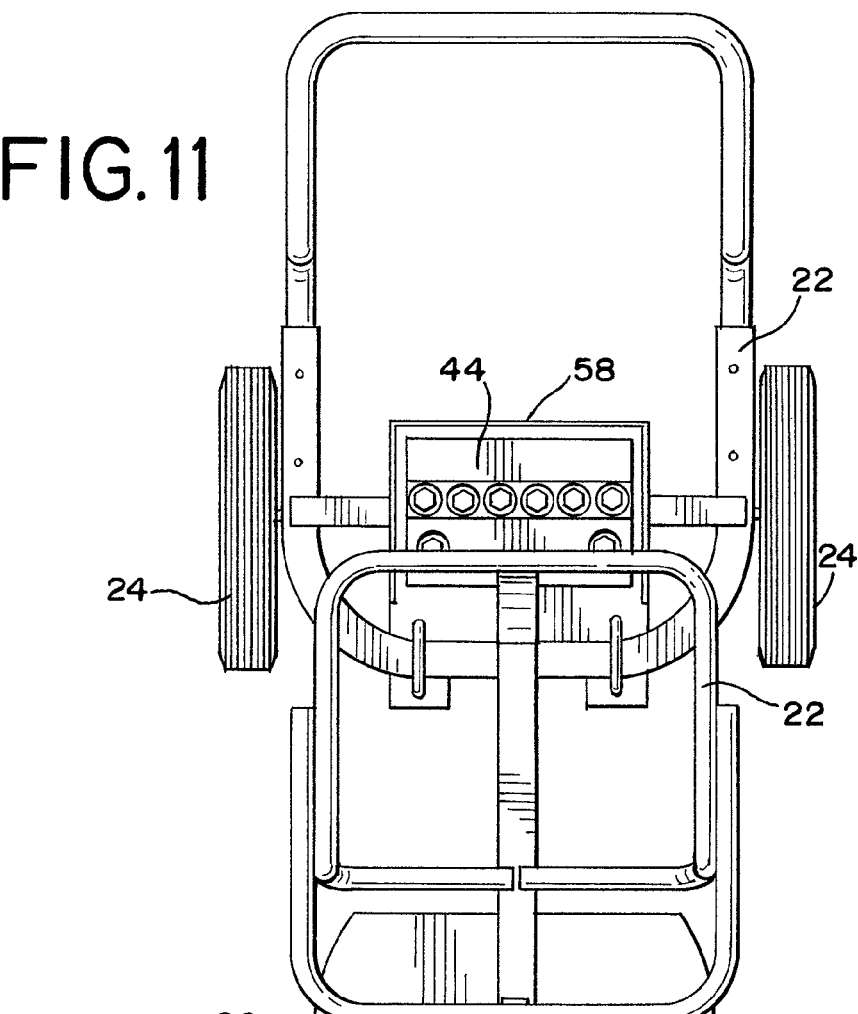
FIG. 11 is a top plan view of the structure shown in FIG. 10.
Figure 12:
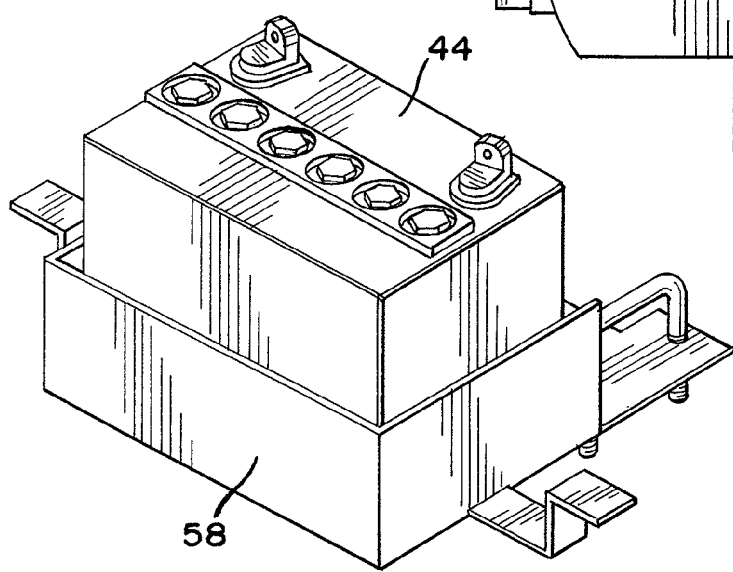
FIG. 12 is an enlarged perspective view of the battery and its associated support structure.
Figure 13:
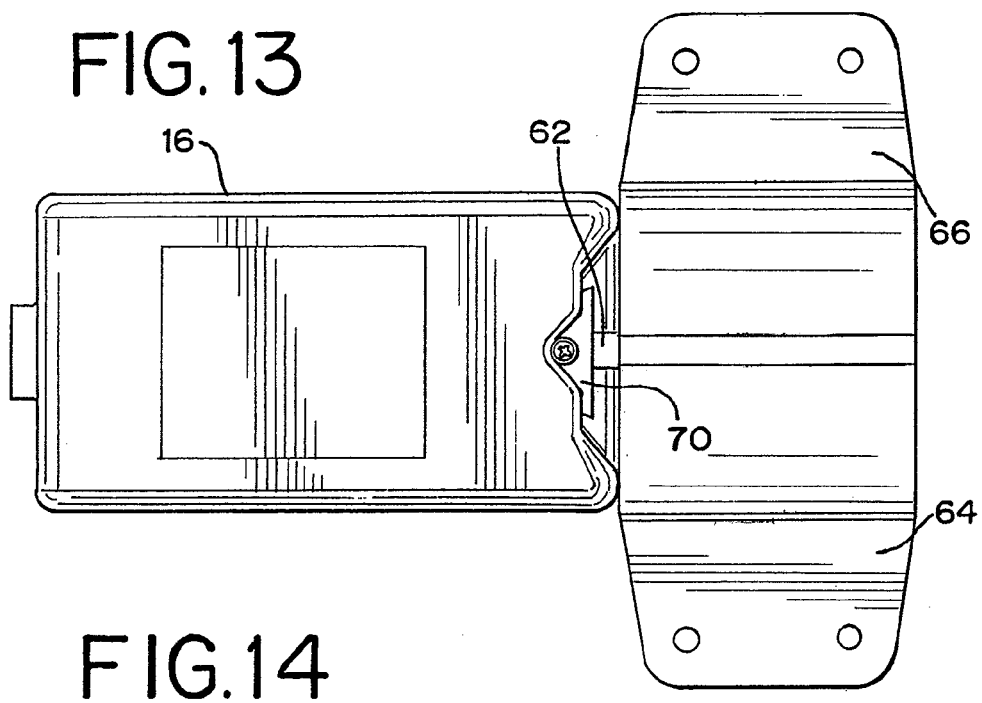
FIG. 13 is a top plan view showing a docking element engaged in a docking port.
Figure 14:
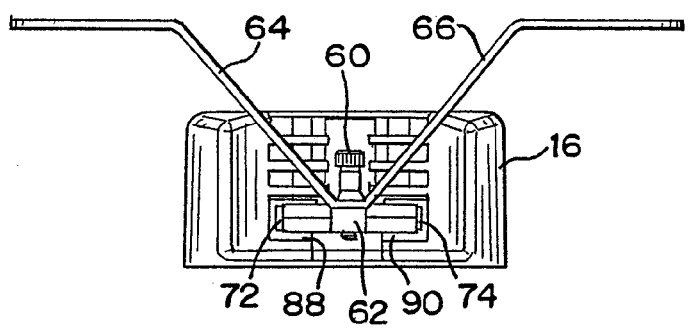
FIG. 14 is an elevational illustration, from the right side of FIG. 13, showing engagement of the docking element in the docking port.

The system according to the invention comprises two basic elements, a vehicle station 10, shown in FIGS. 1 through 3, and a plurality of wheeled vehicles 12, such as strollers. The wheeled vehicles 12, and their associated structure, are depicted in FIGS. 4 through 17, with FIGS. 13 and 14 also illustrating one of the docking ports of the vehicle station 10.

The vehicle station 10 can be constructed of modular components, which therefore allows varying capacities of the vehicle station 10, depending on the number of wheeled vehicles 12. As shown in FIGS. 1 through 3, the vehicle station 10 includes an operator's console 14 which is the location at which users vend one of the wheeled vehicles 12, as explained in co-pending application Ser. No. 11/089,972.

The vehicle station 10 includes a plurality of docking ports 16, spaced appropriately so that the wheeled vehicles 12, when docked, do not interfere with one another. Each of the docking ports 16 is connected to an electrical channel 18 extending from the operator's console 14. All electrical wires and connections can be via the electrical channel 18, including charging of batteries carried by the wheeled vehicle 12, as described below.

The wheeled vehicle 12 is shown in greater detail in FIGS. 14 through 17. The wheeled vehicle 12 can be a stroller, such as those used in shopping malls and the like, or can be any other kind of wheeled vehicle that carries the unique features of the present invention.

The wheeled vehicle 12 includes a body 20 which may be formed of plastic or other materials, preferably materials that can be molded. The body 20 is typically mounted on a frame such as the frame 22 shown in FIGS. 10 and 11, or if the body 20 is sufficiently robust, frame elements can be largely eliminated, with the body 20 being mounted on a suitable structural base frame carrying rear wheels 24 and front caster wheels 26 (FIGS. 10 and 11), which allow ready mobility of the wheeled vehicle 12. The body 20 can include dummy wheels 28 covering the rear and front wheels 24 and 26, as shown. The nature of the body 20 and the nature of the frame 22 form no part of the present invention, and those skilled in the art will readily appreciate how to form a body 20 in whatever shape desired, including whatever frame 22 is needed to complete the structure of the wheeled vehicle 12.

The wheeled vehicle 12 of the type illustrated in the drawing figures is a stroller-type vehicle that is used for transporting a child while the wheeled vehicle 12 is being used. Therefore, a seat 30 is formed in the body 20, and for guiding the wheeled vehicle 12, the upper portion of the body 20 includes an appropriate handle 32.

To entertain an occupant of the seat 30 while the wheeled vehicle 12 is being used, an occupant display screen 34 is located in the body 20 in a forward orientation in relation to the seat 30. The occupant display screen 34 includes a screen driver 36 for controlling what is displayed on the occupant display screen 34. The occupant display screen 34 and driver 36 may be conventional, and are therefore not described in particular detail. Preferably the screen driver 36 and driver 34 are configured so that the operator of the wheeled vehicle 12 can initiate a program displayed on the screen driver 36 for the occupant of the wheeled vehicle 12, without the occupant's need to take any action. Content displayed by the screen 34 may be controlled by a conventional flash card 35, a central memory carried by the wheeled vehicle 12, or both. Other configurations can be used instead, such as having an interactive display on the occupant display screen 34. All of this will be well known to one skilled in the art.

The wheeled vehicle 12 also includes an operator display screen 38 which has a second screen driver 40 for controlling content displayed on the screen 38. The screen 38 and driver 40 can be more sophisticated than the occupant display screen 34 and screen driver 36. Content displayed by the screen 38 may be controlled by a flash card 39, memory in the screen driver 40, or both. Not only can the screen 38 display content to the operator of the wheeled vehicle 12, but also the screen 38 can be interactive (such as a touch screen), and can also be configured so that the operator of the wheeled vehicle 12 can control the content displayed on the occupant display screen 34. All of this can be accomplished using conventional technology, and is therefore not described in greater detail. Appropriate operator instructions can be located in an instruction area 41.

If desired, a further, third display screen can be located on the wheeled vehicle 12. That display screen 42 is driven by a screen driver 43, and may display various content depending on the desired configuration of the wheeled vehicle 12. The display screen 42 is, preferably, independent of the display screens 34 and 38 insofar as content is displayed on the display screen 42. While the content on the screens 34 and 38 is controlled by the operator of the wheeled vehicle 12, the third display screen 42 can display independent content, such as advertisements. Thus, the screen driver 40 can be preloaded with various advertisements which can be seen by persons approaching the wheeled vehicle 12 as it is pushed by its operator.

Not only that, if the wheeled vehicle is used in an area where there are multiple establishments desiring content displayed on the display screen 42, the screen driver 40 can be loaded with multiple advertisements which can either be displayed in a series, or in a more sophisticated fashion, the screen driver 40 can include an antenna receiving signals so that as the wheeled vehicle 12 approaches a particular establishment having a transmitter identifying that establishment, the antenna for the screen driver 40 can receive signals from the transmitter and display advertisement content on the screen 42 pertinent to the particular establishment in the vicinity of the wheeled vehicle 12. Thus, advertisements displayed on the display screen 42 can be location specific to an establishment proximate the wheeled vehicle 12.

The wheeled vehicle 12 is portable, and therefore the screens 34, 38 and 42 must be appropriately powered. To this end, the wheeled vehicle 12 includes a storage battery 44 providing power to a junction 46 via power cables 48 and 50. From the junction 46, cables 52, 54 and 56 provide power to their respective screens 34, 38 and 42 and screen drivers 36, 40 and 43. The cables 52, 54 and 56 can also carry signals and content between the screen drivers 36, 40 and 43. The battery 44 is preferably seated in a housing 58 secured to the frame 22 of the wheeled vehicle 12.

The screen driver 40 can also comprise a central memory for controlling the various functions of the screens carried by the wheeled vehicle 12. That memory can be preloaded, or can be changed by employing conventional wi-fi technology. Furthermore, although the content for the screens 34 and 38 is described above as being changed by flash cards 35 and 39, the wheeled vehicle 12 can have one or more USB ports instead of, or in addition to, the flash cards so that content can be added in that manner to the screen drivers 36, 40 and 43. Other manners of adding content and controls to the wheeled vehicle 12 will be evident to one skilled in the art.

The battery 44 must be periodically charged. Preferably, that occurs when the wheeled vehicle 12 is docked in one of the docking ports 16 of the vehicle station 10. To this end, just as in parent application Ser. No. 11/089,972, the wheeled vehicle 12 carries a striker pin 60 extending upwardly from a tongue 62 protruding forwardly from opposite wings 66 which are secured beneath the wheeled vehicle 12 to the frame 22, such as to the underside of a plate 68, which also carries the front caster wheels 26.

Figure 15:
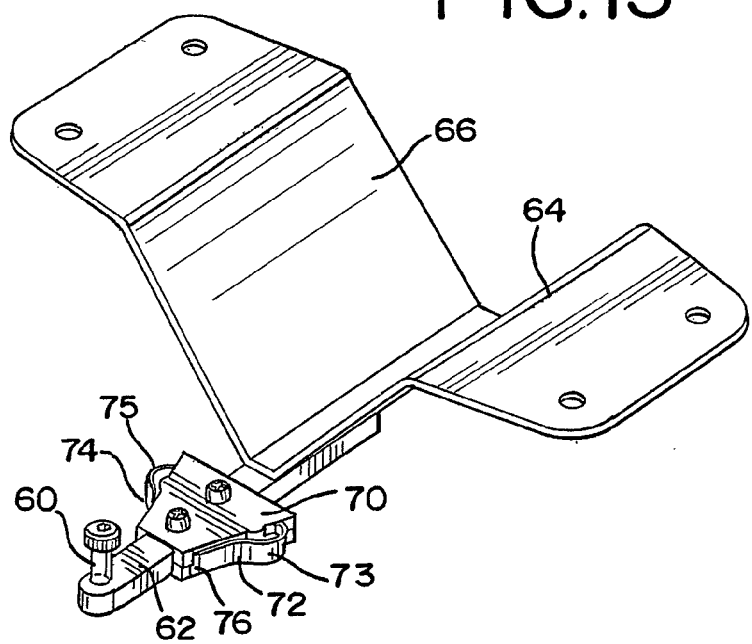
FIG. 15 is a perspective view of the docking element according to the invention, and its associated structure.

The tongue 62 also carries a docking guide 70. Spaced electric contacts 72 and 74 are located on opposite sides of the docking guide 70. As best shown in FIGS. 15 and 17, the contact 72 has a forward end 76 fixed in the docking guide 70. Similarly, the contact 74 has a forward end 78 fixed in the docking guide 70. The contact 72 has a rear end 80 which is free, not fixed, and which is slideable in a channel 82 formed in the underside of the docking guides 70. Similarly, the contact 74 has a free end 84 which is slideable in a channel 86 formed in the underside of the docking guide 70. The electrical contacts 72 and 74 are preferably metal, and therefore conductive of electricity and are formed of a material that can compress when the wheeled vehicle 12 is docked in a docking port 16, and can spring back to the expanded orientation shown in FIGS. 15 and 17 when the wheeled vehicle 12 is free of the docking port 16. The channels 82 and 86 accommodate the compression of the contacts 72 and 74. The contacts 72 and 74 have respective protuberances 73 and 75 to assure a robust electrical connection when the wheeled vehicles 12 are docked.

Each docking port 16 is shaped to accommodate penetration by the striker pin 60 on the tongue 62, as well as the docking guide 70. For providing charging current to the contacts 72 and 74, the docking port 16 include internal contacts 88 and 90. When the wheeled vehicle 12 is docked in the docking port 16, the contact 72 engages the contact 88, and the contact 74 engages the contact 90. Thus, the structure of the docking guide 70 guides proper orientation of the wheeled vehicle 12 into the docking port 16, and also properly aligns the contact 72 and 74 with the respective internal contacts 88 and 90 of the docking port 16. In this manner, once the wheeled vehicle 12 is docked in the docking port 16, the battery 44 can be charged. Appropriate cables (not illustrated) extend from the contacts 88 and 90 to the battery 44. The charging source can be in the vehicle station 10 or elsewhere, is conventional, and thus is not described in greater detail.

An alternative form of electrical contacts for the docking guide 70 is illustrated in FIG. 18. This form of the invention includes the docking guide 70 on the tongue 62, but the strip contacts 72 and 74 are replaced by spring-loaded solid contacts 92 and 94 which retreat into the docking guide 70 when the docking guide 70 is inserted in the docking port 16. The contacts 92 and 94 serve the same function as the contacts 72 and 74 described above. Other types of electrical contacts can be employed, as well for charging the battery 44 when the wheeled vehicle 12 is docked.

Various changes may be made to the invention without departing from the spirit thereof or scope of the following claims.

What is claimed is:

1. A docking system for charging a battery carried by a wheeled vehicle, comprising
   a. a docking element carried by the wheeled vehicle, said docking element being situated beneath the wheeled vehicle and comprising an extended docking guide protruding beneath the wheeled vehicle and spaced first electrical contacts carried by said docking guide, said first electrical contacts being displaceable relative to said docking guide, and
   b. a fixed docking port, said docking port being shaped to accommodate penetration by said docking guide to seat said docking guide and having spaced second electrical contacts in registration with and contactable by respective ones of said first electrical contacts when said docking port is penetrated by said docking guide.

2. The docking system according to claim 1, in which said first electrical contacts each comprise an elongate contact mounted at one end in a contact housing.

3. The docking system according to claim 2, in which each said contact comprises a strip, each strip having a protuberance proximate an opposite free end.

4. The docking system according to claim 3, in which each opposite free end extends into a guide channel in said contact housing.

5. The docking system according to claim 1, including first and second display screens carried by said wheeled vehicle, and a screen driver for each display screen.

6. The docking system according to claim 5, including a separate screen driver for each display screen, and in which each screen driver includes a memory.

7. The docking system according to claim 6, in which the memory of the screen driver of the first display screen has content different from the memory of the screen driver of the second display screen.

8. The docking system according to claim 5, including a third display screen and a third screen driver carried by said wheeled vehicle.

9. The docking system according to claim 8, in which said screen drivers are separate from one another.

* * * * *